UNITED STATES PATENT OFFICE.

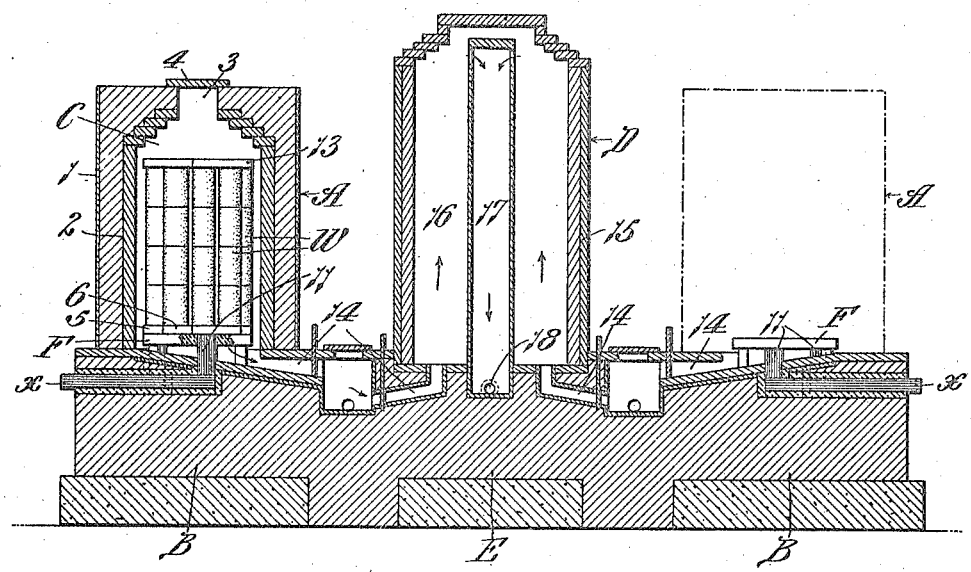
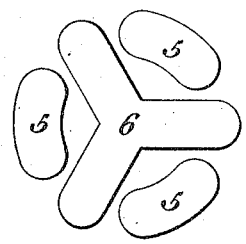
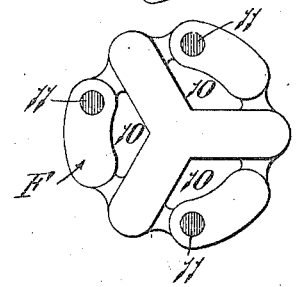
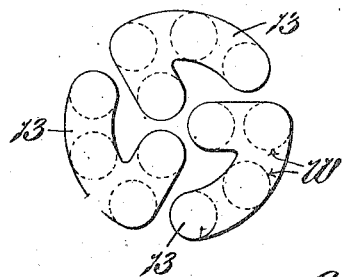

CHARLES H. FULTON, OF ST. LOUIS, MISSOURI, ASSIGNOR, BY MESNE ASSIGNMENTS, TO METALLURGICAL LABORATORIES, INCORPORATED, OF CHICAGO, ILLINOIS, A CORPORATION OF ILLINOIS.

PROCESS FOR RECOVERING MERCURY.

1,264,629.  Specification of Letters Patent.  Patented Apr. 30, 1918.

Application filed April 21, 1917. Serial No. 163,598.

*To all whom it may concern:*

Be it known that I, CHARLES H. FULTON, a citizen of the United States, residing at St. Louis, Missouri, have invented a certain new and useful Improvement in Processes for Recovering Mercury, of which the following is a full, clear, and exact description, such as will enable others skilled in the art to which it appertains to make and use the same.

This invention relates to the recovery of mercury from its ores and from material containing mercury.

The main object of the invention is to provide a practicable process for recovering mercury from its ores and other mercury-bearing material; that can be accurately controlled; that reduces the cost of recovering mercury and which can be practised in an apparatus of simple design operated by a few operatives.

Another object is to provide a mercury briquet of novel composition for use in a distilling apparatus.

Briefly described, my process consists in forming mercury ore or mercury-bearing material into objects that will substantially retain their original form and volume when heated to a distilling temperature, subjecting said objects to heat in a distilling apparatus, so as to convert the mercury in same into vapor, and thereafter treating the mercury vapor in a condenser, so as to convert it into liquid form.

It is immaterial, so far as my broad idea is concerned, how said objects are formed, but I prefer to form them by combining finely-divided mercury ore or mercury-bearing material, a porous substance, a reducing agent or reagent and a binding material mixed in certain proportions, and thereafter forming said mixture into solid objects or briquets under high pressure. The distilling operation can be effected either in a furnace heated by carbonaceous fuel or in an electric distilling furnace. When an electric distilling furnace is used it is necessary to incorporate in the objects or briquets, preferably during the operation of forming same, a material or substance that is a conductor of electricity. Finely-divided coke is particularly well adapted for this purpose, as it is porous and it is also a good electrical conductor. It also serves as a reducing agent if the mercury is in the form of oxid. I prefer to use a carbonaceous binding material, such, for example, as tar or hard coal tar pitch, as I have found that briquets formed from finely-divided material containing mercury, finely-divided coke, a reagent or reducing agent and a carbonaceous binder mixed in certain proportions remain intact and preserve their form and volume when they are subjected to a distilling temperature. Any substance that will desulfurize or absorb the sulfur of the mercury sulfid may be used as the reagent, such, for example, as any one of the oxids of iron, lime or metallic iron in the shape of filings. I prefer, however, to use a hematite or limonite ore containing a high percentage of iron. It is preferable to heat the mixture or add the binder in a molten state to the other ingredients during the process of forming the briquets, so as to cause the particles of the various ingredients to become thoroughly coated with the binder, and while I prefer to use hard coal tar pitch as the binder, any other suitable carbonaceous material may be used in place of hard coal tar pitch. Other porous substances than coke may also be used, but it is preferable to use coke, as it contains no volatile matter to be driven off preliminary to distillation; it gives rise to no deleterious gases during the distilling operation, and as its particles have assumed what may be considered their final form at the time the coke is incorporated in the briquet, said particles will not break down during the distilling operation, thus insuring the continued stability of the briquet during and after the distilling operation.

The shape of the briquets is immaterial, but in practice I form the mixture into briquets of spherical, cylindrical or other preferred form in molds, wherein they are subjected to a pressure of between 500 lbs. and 1000 lbs. per square inch, so as to solidify the mixture and form it into a compact mass that will not swell and crack during the subsequent drying and distilling operations. When a carbonaceous binding material is used it is necessary to preheat the briquets after they have been removed from the molds, or just prior to the distilling operation, so as to drive off the volatile matter in the binding material and convert said binding material into coke, thus eliminating the possibility of the mercury vapor being diluted by volatile hydrocarbons in the distilling operation. This preheating of the briquets also tends to make the briquets better electrical conductors and is advantageous if the briquets are electrically distilled, as hereinafter described. In the preheating and drying operation just referred to it is desirable that the briquets be protected from the action of oxygen, so as to prevent the coke in the outer surface of the briquets from oxidizing and thus causing the outside of the briquets to assume a loose and friable condition, with resulting disintegration of the surface of the briquets.

The proportions of the coke and the mercury ore or mercury-bearing material should be such that a sufficient mass of porous material will be left in the briquet after the distilling operation to maintain substantially the original volume of the briquet. The proportions, of course, will vary with different mercury ores or mercury-bearing materials, but I have found that satisfactory briquets can be produced from finely-divided ore or mercury-bearing material, finely-divided coke, varying from about 10 mesh to 200 mesh, or finer, coal tar pitch and one of the oxids of iron mixed in approximately the following proportions: between 35 and 50%, by weight, of mercury ore or mercury-bearing material; between 15 and 20% iron oxid; between 30 and 40% coke and between 8% and 12% of pitch. The amount of binding material used also varies with the degree of fineness of the coke and the ore or mercury-bearing material, but sufficient binding material should be used to cause the particles of the other ingredients to be completely surrounded by a film of binder which will unite them into a coherent mass by its adhesive action when the briquets are first formed, and which, after the preheating of the briquets and coking of the binder, will permanently and firmly unite the particles of the other ingredients by means of the coked residue of the binder left in the briquets. The essential thing in respect to the iron oxid or other desulfurizing agent used is that there shall be enough to take care of any sulfur that may be combined with the mercury in the ore or mercury-bearing material, thus reacting with the sulfur when a temperature between 900° C. and 1000° C. is obtained in the briquet, liberating the mercury vapor.

In making up such briquets the hard coal tar pitch, if that be the binder employed, is ground and mixed with the other ingredients until a uniform mixture is obtained. The mixture is then heated to the melting point of the pitch, which melts and flows in place and thoroughly coats each particle of the various ingredients. Another way of combining the ingredients is to mix the coke with the ore or mercury-bearing material, then heat the mixture, and thereafter, add molten pitch. Still another way of combining the ingredients is to mix coke and finely-divided pitch with ore or mercury-bearing material and then add some tar and work the mixture cold. The mixture is then formed into briquets in suitable molds in which they are subjected to a high pressure, preferably upward from 500 lbs. to the square inch. If soft coal tar pitch is used as the binder, then the mixed ore or mercury-bearing material and the other ingredients are heated and the soft coal tar pitch is heated above its melting point and added at a certain rate to the other heated ingredients. After the briquets have been removed from the molds they are preheated or dried for the purpose of driving off the volatile hydrocarbons of the binder. This is preferably done by subjecting the briquets, under reducing or non-oxidizing conditions, to a gradually rising temperature to about 400° C. I have found that when pitch is employed as the binding material the pitch will become coked at about 400° C. The briquets may be protected from the action of oxygen during the preheating operation by embedding them in finely crushed coke, by which they are completely covered and inclosed, or by preheating them in a chamber from which oxygen is excluded. A briquet produced in the manner above described consists practically of a coke matrix or cellular structure whose cells are filled with the substance that is to be distilled. This matrix or cellular structure is made up of the coke with which the ore or mercury bearing material is first mixed, and the coke left by the distillation of the pitch binder, and it is of such a character that it will maintain both its original form and volume during the distilling operation and will serve as a proper resistor conductor between the electrodes of an electric distilling furnace.

After the briquets have been formed in the manner above described they are distilled in a distilling furnace, so as to cause the mercury in same to be driven off in the form of vapor, and thereafter said mercury vapor is admitted to a condenser, wherein it is converted into liquid form. The briquets can either be distilled in a furnace heated by carbonaceous fuel, or they can be distilled in an electric distilling furnace. I prefer to electrically distil the briquets by arranging one or more briquets between the electrodes of an electric distilling furnace, so as to form a fixed resistor, and then passing through the briquets a current of electricity of such strength as will cause the briquets to be heated to a distilling temperature.

Figure 1 of the drawings is a vertical sectional view of an apparatus that can be used to practise my process.

Fig. 2 is a top plan view of the bottom electrodes of the furnace on which the briquet columns are arranged.

Fig. 3 is a top plan view of the perforated supporting structure on which said electrodes rest; and Fig. 4 is a top plan view of the connectors that are arranged in engagement with the upper ends of the briquet columns.

The apparatus shown in the drawings comprises a vertically-disposed, hollow member or retort A that is arranged on a base B, so as to form the distilling chamber C of an electric furnace, said member A preferably being removably mounted on the base B, so that it can be lifted therefrom by a crane or other suitable device (not shown) and arranged in position on a second retort base B'. A condenser D, which is provided with a base E, is arranged between the retort bases B and B', said retort bases and condenser base being built of refractory material and preferably combined as a single or integral structure, as shown in the drawings. The retort A is preferably formed from a steel shell 1 heavily lined with refractory and non-conducting material 2 and having its lower end open, the retort being provided at its upper end with a discharge opening 3 that is normally closed by a cover 4 formed of refractory material. The retort base B is provided with a perforated supporting structure F formed of refractory material on which electrodes 5 and 6 are mounted, said supporting structure having numerous holes, spaces or passageways 10 in same, as shown in Fig. 3, through which the products of the distillation can escape from the distilling chamber C. If the furnace is designed for use with a three-phase alternating current connection of the Y-type, the electrode 6 will consist of a three-arm neutral point electrode and the electrodes 5 will consist of substantially segmental-shaped electrodes that are arranged between the arms of the neutral point electrode 6, as shown in Fig. 2, the electrodes 5 and 6 being preferably formed from graphite or an ore-coke-pitch mixture. The graphite conductors $x$ that supply electric current to the electrodes 5 are led into the retort base B through openings therein, and each of said conductors $x$ is connected at its inner end to a plug 11 of conducting material that is arranged in an opening in the supporting structure F, the upper ends of said conducting plugs 11 contacting with the electrodes 5 that rest upon the supporting structure F.

Briquets of the composition and character previously described have a specific resistance of about .03 ohms per cubic inch, and when a number of such briquets are arranged between the electrodes of an electric distilling furnace so as to form a fixed resistor, the resistance of the resistor may be readily calculated by the cross section of the briquets, the height and number of the briquet columns in the distilling chamber and the manner of connecting the briquet columns together. The briquets can be made in the form of comparatively short, cylindrical-shaped objects, a number of which can be superimposed one upon the other to form a vertical column, or each briquet can consist of a comparatively long object. In setting up a charge in a furnace of the design herein illustrated twelve briquet columns W are arranged in six pairs on the electrodes 5 and 6, the neutral point electrode 6 supporting six columns and each of the electrodes 5 supporting two columns. Thereafter, conductors 13 of the form shown in Fig. 4 are arranged in engagement with the upper ends of the briquet columns W, so as to electrically connect the tops of two adjacent pairs of briquet columns. After the briquets have been set up and connected together in the manner described the retort A is arranged in operative position on the base B over said briquet columns. When the current is turned on the current conveyed to the pair of briquet columns resting on the electrode 5 at the left hand side of Fig. 2 will pass upwardly through said columns to the conductor 13 at the upper ends of same which electrically connects said columns to the briquet columns supported by the lower left hand arm of the electrode 6, thence downwardly through the briquet columns resting on said arm to the neutral point at the center of the electrode 6. The passage of the current for the other pairs of briquet columns is similarly all convergent on the neutral point of the electrode 6, which gives the common Y connection of the alternating three-phase current. It will, of course, be understood that it is immaterial, so far as my invention is concerned, how the electric current is supplied to the briquet columns, so long as the electrical resistance is such as to cause a sufficient heat development within the charge itself to practically completely distil the mercury therefrom. By varying the amount of current sent through the briquet columns W the speed of distillation may be kept under perfect control and the rate of distillation can be varied at will. The current is preferably supplied to the furnace through a transformer so designed as to supply current of different voltages. If the current is too great or too small at any given voltage, the voltage of the transformer may be decreased or increased until the proper flow of current is obtained. The reaction between cinnabar and the desulfurizing agents takes place between 900° C. and 1000° C., and mercury vapor is forced from the briquets. This vapor then passes to the condenser D through a passageway 14. The condenser D of the apparatus herein shown consists of a cylindrical shell 15 similar to the shell of the retort A and lined with fire brick, or the condenser may be constructed of iron alone. The vapor passes upwardly through the annular space 16 between the walls of the condenser and a cylinder 17 that is arranged inside of same and then reverses and flows downwardly through the cylinder 17 to a gas outlet 18. Baffles (not shown) may be arranged in the vapor path to increase the condensing surface. When the complete distillation has taken place in the distilling furnace the retort is then raised by means of a crane or other suitable hoisting apparatus and the briquets discharged in a suitable manner. The retort A is carried to the other retort base B', upon which briquets have been previously set up, and lowered into operative position over said briquets. The heat stored in the walls of the retort A is used to preheat and bake the raw briquets until they become good conductors of electricity, the volatile matter that is driven off during the preheating operation being allowed to escape through the opening 3 in the upper end of the retort that is normally closed by the cover 4, if it is considered undesirable to have said volatile matter pass through the condenser. After the briquets have been distilled they can be used again to form the conducting material or the desulfurizing or reducing reagent of new briquets until the distilled briquets become commercially valuable due to the continued concentration of valuable metals from the ore, such as gold, platinum, silver, copper, lead or other metals of higher volatilizing points than the one distilled or until the distilled briquets become worthless, due to the concentration of the gang of the ore.

A process of the character above described can be accurately controlled; it materially reduces the cost of treating mercury ores and mercury-bearing material, owing to the fact that the material being treated is in such form that it can be handled conveniently during the operations of charging the distilling furnace and removing the residue therefrom; and still another desirable feature of said process is that a distilling apparatus of great capacity can be used successfully to practice the process.

Having thus described my invention, what I claim, and desire to secure by Letters Patent, is:

1. A process for recovering mercury, characterized by forming mercury ore or mercury-bearing material into objects that will retain substantially their original form and volume when subjected to a distilling temperature, heating said objects to convert the mercury in same into vapor, and thereafter treating the mercury vapor so as to convert it into the form desired.

2. A process for recovering mercury, characterized by combining finely divided mercury ore or mercury-bearing material with a porous substance, a reducing agent or reagent and a binding material, forming said mixture into objects that will retain their approximately original form and volume when subjected to a distilling temperature, heating said objects so as to drive off the mercury in the form of vapor, and thereafter converting said mercury vapor into liquid form.

3. A process for recovering mercury, characterized by combining finely divided mercury ore or mercury-bearing material with finely divided coke and a carbonaceous binding material, forming said mixture into briquets under pressure, sufficient binding material being used so as to insure the briquets retaining their substantially original form and volume when they are subjected to a distilling temperature, heating said briquets so as to drive off the volatile matter in the carbonaceous binding material, and thereafter distilling the briquets.

4. A process for recovering mercury, which consists in forming briquets from a finely divided ore or mercury-bearing material, a porous substance, a reducing agent or reagent and a binding material mixed in such proportions that the briquets will retain their approximately original form and volume when they are subjected to a distilling temperature, heating said briquets in a distilling chamber so as to liberate the vapor in same, and thereafter condensing said mercury vapor.

5. A process for recovering mercury, characterized by combining finely divided mercury ore or mercury-bearing material with other suitable substances so as to form a cellular structure capable of withstanding distilling temperatures and having its cells or interstices containing metal, subjecting said cellular structure to heat in a distilling chamber so as to vaporize the mercury therein, and thereafter condensing said mercury vapor.

6. A process for recovering mercury, characterized by forming mercury ore or mercury-bearing material into an object that is an electrical conductor then passing a current of electricity through said objects so as to heat it sufficiently to cause the mercury in same to vaporize, and collecting and condensing said mercury vapor.

7. A process for recovering mercury, characterized by forming mercury ore or mercury-bearing material into an electrical conducting object that will maintain its approximately original form and volume when subjected to a distilling temperature, passing a current of electricity through said object so as to distil the mercury out of same, and thereafter collecting and condensing the mercury vapor evolved in the distilling operation.

8. A process for recovering mercury, characterized by forming mercury ore or mercury-bearing material into briquets that will retain their approximately original form and volume when subjected to a distilling temperature, interposing one or more of said briquets as a continuous resistor between the electrodes of an electric furnace and passing a current of electricity through them to heat the briquets to a distilling temperature, and thereafter condensing the mercury vapor evolved by the distilling operation.

9. A briquet for use in a distilling furnace composed of mercury ore or mercury-bearing material, a porous substance, a reducing agent or reagent and a binding material combined into a compact mass that will retain its substantially original form and volume when subjected to a distilling temperature.

10. A briquet for use in distilling furnaces formed from finely divided mercury ore or mercury-bearing material, finely divided coke, a binding material, and if necessary, a reagent, mixed in such proportions that the briquet will retain its substantially original form and volume when subjected to a distilling temperature.

11. A briquet for use in distilling furnaces, consisting of a compressed object comprising a cellular portion formed of conducting material and having its cells or interstices filled with finely divided mercury ore or mercury-bearing material.

12. A briquet for use in distilling furnaces, consisting of a compressed object composed of finely divided mercury ore or mercury-bearing material, finely divided coke, a reducing agent or reagent and the coked residue of a carbonaceous binder, mixed in such proportions that the briquet will retain its approximately original form and volume when subjected to a distilling temperature.

CHARLES H. FULTON.